US010351211B2

(12) United States Patent
Nakamura

(10) Patent No.: US 10,351,211 B2
(45) Date of Patent: Jul. 16, 2019

(54) SYSTEM FOR MOORING OFFSHORE STRUCTURE GROUP AND METHOD FOR MOORING OFFSHORE STRUCTURE GROUP

(71) Applicant: MODEC, INC., Tokyo (JP)

(72) Inventor: Takuju Nakamura, Tokyo (JP)

(73) Assignee: MODEC, INC., Tokyo (JP)

( * ) Notice: Subject to any disclaimer, the term of this patent is extended or adjusted under 35 U.S.C. 154(b) by 26 days.

(21) Appl. No.: 15/324,427

(22) PCT Filed: Sep. 25, 2014

(86) PCT No.: PCT/JP2014/075358
§ 371 (c)(1),
(2) Date: Jan. 6, 2017

(87) PCT Pub. No.: WO2016/006126
PCT Pub. Date: Jan. 14, 2016

(65) Prior Publication Data
US 2017/0166286 A1    Jun. 15, 2017

(30) Foreign Application Priority Data
Jul. 8, 2014    (JP) ................................ 2014-140793

(51) Int. Cl.
*B63B 21/50*    (2006.01)
*B63B 35/00*    (2006.01)
(Continued)

(52) U.S. Cl.
CPC .............. *B63B 21/50* (2013.01); *B63B 21/20* (2013.01); *B63B 35/00* (2013.01);
(Continued)

(58) Field of Classification Search
CPC . B63B 21/50; B63B 21/502; B63B 2021/504; B63B 2035/446; B63B 2035/4466
See application file for complete search history.

(56) References Cited

U.S. PATENT DOCUMENTS

2009/0183667 A1* 7/2009 Draper .................... B63B 21/50
114/293
2011/0215650 A1* 9/2011 Slocum .................. F03B 13/06
307/72

(Continued)

FOREIGN PATENT DOCUMENTS

DE    102012007613 A1    10/2013
JP    2004-176626 A    6/2004
(Continued)

OTHER PUBLICATIONS

International Search Report dated Nov. 25, 2014, issued in counterpart International Application No. PCT/JP2014/075358 (2 pages).

(Continued)

*Primary Examiner* — Andrew Polay
(74) *Attorney, Agent, or Firm* — Westerman, Hattori, Daniels & Adrian, LLP

(57) ABSTRACT

A system includes mooring lines arranged respectively in three to eight directions, and at least one of a plurality of offshore structures included in the offshore structure group is moored by locking the mooring lines in the respective directions with separate mooring bases, and at least one of the mooring bases locks the mooring lines which are connected respectively to three to eight of the offshore structures in the offshore structure group. With this configuration, even when part of the mooring lines mooring the offshore structures is broken or the mooring function of the mooring bases is lost, although the offshore structure moves, the offshore structure is kept being moored by the remaining mooring- (Continued)

line group, so that the offshore structure can be prevented from colliding with another offshore structure.

4 Claims, 12 Drawing Sheets

(51) Int. Cl.
*B63B 21/20* (2006.01)
*B63B 35/44* (2006.01)

(52) U.S. Cl.
CPC ... *B63B 2021/203* (2013.01); *B63B 2021/505* (2013.01); *B63B 2035/446* (2013.01); *Y02E 10/72* (2013.01)

(56) References Cited

U.S. PATENT DOCUMENTS

| | | |
|---|---|---|
| 2013/0152839 A1 | 6/2013 | Graf |
| 2014/0145442 A1 | 5/2014 | Hart |
| 2014/0322996 A1 | 10/2014 | Nakamura et al. |

FOREIGN PATENT DOCUMENTS

| | | |
|---|---|---|
| WO | 02/10589 A1 | 2/2002 |
| WO | 2008/047011 A2 | 4/2008 |
| WO | 2013/065826 A1 | 5/2013 |

OTHER PUBLICATIONS

Supplementary European Search Report dated Mar. 1, 2018, issued in counterpart European Application No. 14897312. (2 pages).

\* cited by examiner

SYSTEM FOR MOORING OFFSHORE STRUCTURE GROUP AND METHOD FOR MOORING OFFSHORE STRUCTURE GROUP

TECHNICAL FIELD

The present invention relates to a system for mooring an offshore structure group and a method for mooring an offshore structure group, which are employed in mooring, as a group, a plurality of offshore structures of a spar-type or the like on which wind turbines or the like are mounted.

BACKGROUND ART

When a wind turbine facility or the like is mounted on an offshore structure in a water area having a deep water depth, a semi-submersible type, a tension leg platform (TLP), or the like may possibly be employed. In such cases, the wind turbine facility or the like and the offshore structure are integrally assembled and subjected to test operation onshore, and then towed to an installation site, and moored by a mooring system.

In the case of the spar-type offshore structure, the spar is an offshore structure floating in an upright standing state like a fishing float, and a large part of the float is submerged under the sea level by injection of ballast water or the like. The spar is relatively unlikely to swing, and can support a heavy upper structure. In the case of a spar-type offshore structure equipped with a wind turbine facility, the draft of the float may be as deep as approximately 40 m to 80 m, and the float portion becomes a large structure of approximately 1000 t (ton).

As the spar-type offshore structure, a float-type fluid force utilizing system is provided as described in International Publication No. 2013/065826, for example. In this system, a horizontal-axis wind wheel or a vertical-axis wind wheel for utilizing wind force is disposed at an on-water portion thereof, and a horizontal axis water wheel or a vertical axis water wheel for utilizing tidal current force is disposed under the water, and which utilizes the horizontal axis water wheel or the vertical axis water wheel as ballast.

In addition, regarding the spar-type offshore structure used as the offshore wind power generation facility, not only one but a large number of spar-type offshore structures are moored in an installation site suitable for offshore wind power generation. For example, as described in Japanese patent application No. 2004-176626, an offshore wind power generation facility is proposed, in which a plurality of floats each supporting a wind turbine facility in an upright standing state are coupled to one another by a mooring chain provided with an intermediate sinker in a middle, and an appropriate float is further connected with a mooring chain provided with a mooring anchor at one end and with an intermediate sinker in a middle.

In the offshore wind turbine facility, as an example of the arrangement of the plurality of offshore power generation facilities and mooring bases, there is shown an arrangement in which floats, which are offshore power generation facilities, are arranged at vertices of a regular hexagon in a plan view, and the floats are moored by a central offshore structure, which is arranged at the center of the regular hexagon in the plan view, and mooring anchors, each of which constitutes a regular triangle with two adjacent floats in the plan view, by using mooring chains in seven directions, which are provided with intermediate sinkers and connect the one central float and the respective six floats, the mooring chain in one direction is locked with the central float and the mooring chains in the remaining directions are locked with the six mooring anchors.

On the other hand, generally, as illustrated in FIG. 1, one offshore structure is often moored by mooring lines in three directions or more. The mooring is often formed of a drag anchor, as well. In such mooring, the mooring line in one direction formed of a plurality of, for example two or three mooring lines. The strength of each mooring line is set such that even when one of the mooring lines is broken under severe weather or oceanographic condition, the remaining mooring lines are not broken like a chain reaction can keep mooring the offshore structure at the original position.

For this reason, as the number of the mooring lines increase, a breaking strength required for each mooring line and a holding power required for the drag anchor increases, bringing about a problem of high costs for mooring the offshore structures.

PRIOR ART DOCUMENTS

Patent Documents

Patent Document 1: International Publication No. 2013/065826

Patent Document 2: Japanese patent application No. 2004-176626

SUMMARY OF THE INVENTION

Problems to be Solved by the Invention

In the case of an offshore structure with a wind turbine facility or the like which has no problems even when the offshore structure moves to a certain degree under severe weather and oceanographic conditions, the offshore structure does not necessarily have to be moored at the original position when the mooring line holding the offshore structure in position is broken, unlike the case of an offshore structure which includes a drill pipe for oil-well drilling and an oil pipe and accordingly which is required to be strictly held at the position. Accordingly, there is an increasing acceptance of such a technical idea that in the former case, it suffices that an offshore structure is not brought into a drifting state and also does not collide with another offshore structure.

In accordance with this technical idea, the prevent inventor conceived of such a mooring system that even when a mooring line in a direction with the largest load is broken or a drag anchor is dragged under harsh weather and oceanographic conditions, the mooring system can prevent the offshore structure from drifting by the mooring-line group of the remaining directions, and also conceived of an arrangement of an offshore structure group and a mooring-base group in which another offshore structure does not exist within the movement range of offshore structure, so that even the offshore structure moves, the offshore structure is prevented from colliding with the other offshore structure.

Moreover, when a mooring line in a direction with the largest load is broken or a drag anchor is dragged under harsh weather and oceanographic conditions, the mooring directions of the mooring-line group in the remaining directions change due to movement of the offshore structure, which in turn changes the anchor-holding force of the drag anchor. For this reason, as the mooring base, it is preferable to use a mooring pile or the like which has a wide range of exerting a mooring force relative to a turning direction when viewed from above and in which the mooring force is stable in magnitude, instead of the drag anchor which exert the anchor-holding force only in one direction.

The present invention has been made in view of the above-described circumstances, and an object of the present invention is to provide a system for mooring an offshore structure group and a method for mooring an offshore structure group which are such that in a system for mooring an offshore structure group with a wind turbine facility or the like mounted thereon, even when part of mooring lines mooring an offshore structure is broken and the loss of the mooring function of the mooring bases occurs under severe weather and oceanographic conditions, although the offshore structure moves, the offshore structure is kept being moored by the remaining mooring-line group, so that the offshore structure can be prevented from drifting or colliding with another offshore structure, thus making it possible to moor the offshore structure at the offshore installation site safely without excessively increasing the strength of the mooring lines in the mooring directions.

Means for Solving the Problems

A system for mooring an offshore structure group of the present invention for achieving the above-described object is configured such that the system includes: mooring lines arranged respectively in three to eight directions, in which at least one of the offshore structures in the offshore structure group is moored by locking the mooring lines in the respective directions with separate mooring bases, and at least one of the mooring bases locks the mooring lines which are connected respectively to three to eight of the offshore structures in the offshore structure group.

According to this configuration, the plurality of offshore structures can be moored efficiently by a small number of the mooring lines and a small number of the mooring bases. If the number of the directions of the mooring lines is less than three, that is, two or less, the movement range of the moored floating section increases. Otherwise, attempt to decrease the movement range increases the mooring force required for the mooring lines, which is thus impractical. On the other hand, if the number of the directions of the mooring lines mooring the offshore structure 10 is nine or more, the numbers of the mooring lines and the mooring bases increase, thus increasing the cost, which is thus impractical.

In addition, regarding the mooring bases as well, when less than two mooring lines is provided for one mooring base, the number of the mooring bases 30 increases, thus increasing the cost. On the other hand, in the case of providing the mooring lines connected respectively to nine offshore structures or more, when part of the mooring lines mooring the offshore structure is broken and the offshore structure moves, the mooring lines are likely to intersect each other and to be broken at the mooring base, making it difficult to prevent the mooring lines from intersecting each other, which is thus impractical.

Then, defining the number of the mooring lines between the offshore structures and the mooring bases enables a large number of the offshore structures to be moored by a small number of the mooring bases and a small number of the mooring lines. Moreover, it is possible to easily achieve a combination of the respective arrangements of the offshore structures, the mooring bases, and the mooring lines such that even if part of the mooring lines mooring the offshore structures is unexpectedly broken, it is possible to permit a large change in the mooring direction of each mooring line of the remaining mooring-line group at the connection portion on the offshore structure side and a large change in the mooring direction thereof at the locking portion on the mooring base side, accompanying the movement of the offshore structure, making it possible to keep mooring the offshore structure with the remaining mooring-line group, and to avoid the drifting of the offshore structure.

In the above-described system for mooring an offshore structure group, the offshore structures and the mooring bases are arranged in such an asymmetrical arrangement pattern that in a case where one of the mooring lines which moor one of the offshore structures in the offshore structure group is broken, when the one offshore structure moves within a range allowed by the remaining mooring lines, the one offshore structure is geometrically incapable of colliding with the other offshore structures.

According to this configuration, a measure against the case where one of the mooring lines is broken is achieved by the arrangements of the offshore structures and the mooring bases on the assumption that the offshore structures move. This allows setting of smaller design strength of each mooring line than that in the conventional technique. Therefore, it is possible to reduce the weight of each mooring line, facilitate the installation work for the mooring lines, and reduce the cost.

In the above-described system for mooring an offshore structure group, the offshore structures and the mooring bases are arranged in such an asymmetrical mooring arrangement pattern that in a case where a mooring function of one of the mooring bases is lost, when any of the offshore structures moored by the mooring lines locked with the one mooring base moves within a range allowed by the remaining mooring lines, the offshore structure is geometrically incapable of colliding with the other offshore structures.

According to this configuration, a measure against the case where the mooring function of one of the mooring bases is lost is achieved by the arrangements of the offshore structures and the mooring bases on the assumption that the offshore structures move. This allows setting smaller degree of fixing each mooring base, making it possible to reduce the weight of each mooring base, facilitate the installation work for the mooring bases, and reduce the cost.

In addition, in the system for mooring an offshore structure group, regarding the arrangement of a plurality of the mooring bases locked with the mooring lines which moor the offshore structures, at least one of the offshore structures is such that there is a different angle among angles made by the mooring lines which moor the at least one offshore structure when viewed from above.

Alternatively, in the system for mooring an offshore structure group, regarding the arrangement of a plurality of the mooring bases locked with the mooring lines which moor the offshore structures, at least one of the offshore structures is such that there is a different mooring distance among mooring distances between the at least one offshore structure and the respective mooring bases when viewed from above.

According to these configurations, the mooring line in such a direction as to be highly likely to undergo the largest mooring force and be broken under the severe weather and oceanographic conditions predictable, and the mooring lines in the remaining two directions or more, which remain in the case of breakage of the above mooring line and restricting the movement range of the offshore structure, are different roles. Accordingly, the setting of different directions for the mooring lines or different lengths for the mooring lines makes it possible to improve the mooring efficiency with appropriate lengths and strengths for the roles of the mooring lines. As a result, the cost for mooring can be reduced. From a different perspective, these configurations reduce the number of the mooring bases, and thus dramatically reduce the amount of work in offshore construction, which accounts for a large part of the cost of projects such as ocean wind power generation, and reduce the cost.

Furthermore, the offshore structure drifting or moving due to breakage of the mooring line or malfunction of the mooring base can be prevented from moving toward the adjacent offshore structures. In other words, the movement direction of the offshore structure which has started moving can be deflected from the adjacent offshore structures.

Moreover, in the system for mooring an offshore structure group, regarding the mooring distances, a difference between a large mooring distance and a small mooring distance among the mooring distances is equal to or larger than a diameter of a circumscribed circle of a plane figure of the moored offshore structure in a projection obtained by viewing the offshore structure from above, and the large mooring distance is three times or less the small mooring distance. Note that, the mooring distance is a horizontal distance from a locking position of the mooring line at the offshore structure to a fastening position of the mooring line at the mooring base.

According to this configuration, since the magnitude of the mooring distance is defined, the arrangement of the offshore structures and the mooring bases can be easily set according to this definition such that the offshore structure moving due to breakage of the mooring line or malfunction of the mooring base is prevented from moving toward the adjacent offshore structure 10, within a practical range.

Moreover, more specific arrangement patterns include: arrangement patterns A, B, C, D provided with different mooring distances and mooring directions in the arrangement of the offshore structures by changing the lengths of the mooring lines, an arrangement pattern E provided with asymmetrical mooring angles in the arrangement of the offshore structures by changing the angles of the mooring lines, and a mixed arrangement pattern F, which are each configured as described below.

The arrangement pattern A is configured such that each of the offshore structures is moored by two long mooring lines and one short mooring line, and the mooring directions of the short mooring lines of each adjacent offshore structures are oriented in the same direction. The arrangement pattern B is configured such that each of the offshore structures is moored by two long mooring lines and one short mooring line, and the mooring directions of the short mooring lines of each adjacent offshore structures are oriented in opposite directions from each other.

Moreover, the arrangement pattern. C is configured such that each of the offshore structures is moored by one long mooring line and two short mooring lines, and mooring directions of the long mooring lines of each adjacent offshore structures are oriented in the same direction. The arrangement pattern D is configured such that each of the offshore structures is moored by one long mooring line and two short mooring lines, and mooring directions of the long mooring lines of each adjacent offshore structures are oriented in opposite directions from each other. Note that, in each of the arrangement patterns A, B, C, D, although there are two angles made by the long mooring line and the short mooring line at the mooring base, these angles may be the same angle or may be different Moreover, the arrangement pattern E is configured such that each offshore structure is moored by three, first to third mooring lines, and that the angle made by the first mooring lines and the second mooring lines is 80° or more, but less than 120°; the angle made by the second mooring lines and the third mooring lines is 120° or more, but 140° or less; and the angles made by the third mooring lines and the first mooring lines is 120° or more, but 140° or less. The arrangement pattern F of the mixed arrangement pattern is configured such that the offshore structures are moored by the long mooring lines and the short mooring lines, and the offshore structures include: an offshore structure of a first type which is moored by two of the long mooring line and one of the short mooring line; an offshore structure of a second type which is moored by one of the long mooring line and two of the short mooring line; and an offshore structure of a third type which is moored by three of the short mooring line.

According to these arrangement patterns A, B, C, D, E, F, it is possible, by using a relatively simple geometrical pattern, to avoid a case where when one of the mooring lines is broken, the offshore structure moored by the remaining mooring lines moves and collides with another offshore structure until being pulled and stopped by the remaining mooring lines. Moreover, since the long mooring lines can exert a larger mooring force than the short mooring lines, the mooring lines can be arranged efficiently and effectively by orienting the directions of the long mooring lines 20A in a direction in which a large external force acts.

Therefore, by selecting and employing one of the arrangement patterns A, B, C, D, E, F in accordance with the wideness, water depth, the shape of the water bottom, and the like of an installation site for the offshore structure group, it is possible to easily achieve such an arrangement that even when part of the mooring lines mooring the offshore structures is broken or the mooring function of the mooring bases is lost, although the offshore structure moves, the offshore structure is kept being moored by the remaining mooring-line group, so that the offshore structure can be prevented from colliding with another offshore structure.

Furthermore, in the system for mooring an offshore structure group, at each of the mooring bases, each mooring line is locked with a mooring-line fastening device provided on a side surface, a corner, or an upper portion of a columnar body provided upright on a water bottom, and the mooring-line fastening device is fixed to the columnar body in such a manner as to be swingable in a horizontal direction.

According to this configuration, even when the mooring direction is changed by turning, a change in the mooring force is smaller than the case where the mooring base is formed of a drag anchor. In addition, with such a very simple structure as the swinging of the mooring-line fastening device, a large turnable range of each mooring line can be taken at the locking portion on the mooring bases side when viewed from above. Moreover, since the mooring-line fastening device with which the mooring line is locked is swingable, even when the offshore structure moves from the initially moored position to change the mooring directions of the mooring lines due to breakage of part of the mooring line or loss of the mooring function of the mooring base, it is possible to prevent a large force from being applied to the mooring line and the columnar body.

Moreover, in the system for mooring an offshore structure group, at the mooring base with which the long mooring line and the short mooring line are locked, a locking position of the long mooring line is located lower than a locking position of the short mooring line. According to this configuration, in the arrangement patterns B, D, F, when part of the mooring line is broken or the mooring function of the mooring base is lost, there is a possibility that the mooring direction of the short mooring line is largely changed to go beyond the long mooring line connected to the same mooring base, but there is no possibility that the mooring direction of the long mooring line is largely changed to go beyond the short mooring line connected to the same mooring base. For this reason, even when the offshore structure moves from the initially moored position to largely change the mooring direction of any of the mooring line extending in a central direction and the mooring lines extending in adjacent directions due to breakage of part of the mooring line or loss of the mooring function of the mooring bases, the mooring directions can be changed without interfering with each other. Therefore, even when the mooring line in one direction which moors the offshore structure is broken, and the mooring directions of the remaining mooring lines are changed, it is possible to avoid twining of the long mooring line and the short mooring line, and to thus prevent the mooring lines from damaging.

In the above-described system for mooring an offshore structure group, each mooring line is locked with the mooring locking device at a connection portion on the offshore structure side, and the mooring locking device is fixed to the offshore structure in such a manner as to be swingable in a horizontal direction.

According to this configuration, with such a very simple structure as the swinging of the mooring locking device, a large turnable range of each mooring line can be taken at the connection portion on the offshore structure side when viewed from above. In addition, since the mooring locking device with which the mooring line is locked is swingable, even when the offshore structure moves from the initially moored position to change the mooring directions of the mooring lines due to breakage of part of the mooring lines or loss of the mooring function of the mooring base, it is possible to prevent a large force from being applied to the mooring lines and the mooring locking device.

Furthermore, in the above-described system for mooring an offshore structure group, at each of the mooring bases, each mooring line is locked with a mooring-line fastening device provided on a side surface, a corner, or an upper portion of a columnar body provided upright on a water bottom, the mooring-line fastening device is fixed to the columnar body in such a manner as to be swingable in a horizontal direction, at the mooring base with which the long mooring line and the short mooring line are locked, a locking position of the long mooring line is located lower than a locking position of the short mooring line, each mooring line is locked with the mooring locking device at a connection portion on the offshore structure side, and the mooring locking device is fixed to the offshore structure in such a manner as to be swingable in the horizontal direction.

According to this configuration, with such a very simple structure as the swinging of the mooring-line fastening device and the swinging of the mooring locking device, a large turnable range of each mooring line can be taken. Therefore, even when the offshore structure moves from the initially moored position to change the mooring directions of the mooring lines due to breakage of part of the mooring lines or loss of the mooring function of the mooring base, it is possible to prevent a large force from being applied to the mooring lines, the columnar body, and the mooring locking device. In addition, the mooring lines can change their mooring directions without interfering with each other, so that twining of the mooring lines can be avoided.

A method for mooring an offshore structure group of the present invention for achieving the above-described object is a method for mooring an offshore structure group including a plurality of offshore structures, characterized in that the method includes: using mooring lines arranged in three to eight directions, in which at least one of the offshore structures in the offshore structure group is moored by locking the mooring lines in the respective directions with separate mooring bases, and at least one of the mooring bases locks the mooring lines which are connected respectively to three to eight of the offshore structures in the offshore structure group.

According to this method, the plurality of offshore structures can be moored efficiently by a small number of the mooring lines and a small number of the mooring bases. In addition, defining the number of the mooring lines between the offshore structures and the mooring bases enables a large number of the offshore structures to be moored by a small number of the mooring bases and a small number of the mooring lines. Moreover, it is possible to easily achieve a combination of the respective arrangements of the offshore structures, the mooring bases, and the mooring lines such that even if part of the mooring lines mooring the offshore structures is broken, it is possible to permit a large change in the mooring direction of each mooring line of the remaining mooring-line group at the connection portion on the offshore structure side and a large change in the mooring direction thereof at the locking portion on the mooring base side, accompanying the movement of the offshore structure, making it possible to keep mooring the offshore structure with the remaining mooring-line group, and to avoid the drifting of the offshore structure.

Effects of the Invention

As described above, according to the system for mooring an offshore structure group and the method for mooring an offshore structure group of the present invention, in mooring an offshore structure group with a wind turbine or the like mounted thereon, even when part of the mooring lines mooring the offshore structure is broken under severe weather and oceanographic conditions, although the offshore structure moves, the offshore structure is kept being moored by the remaining mooring-line group, so that the offshore structure can be prevented from drifting or colliding with another offshore structure, thus making it possible to moor the offshore structure at the offshore installation site safely without excessively increasing the strength of the mooring lines in the mooring directions.

MODES FOR CARRYING OUT THE INVENTION

Hereinafter, a system for mooring an offshore structure group and a method for mooring an offshore structure group of embodiments according to the present invention will be described. In the description of the embodiments, a spar-type offshore structure in which a vertical-axis wind wheel utilizing wind power is disposed upper the portion above the water surface will be described as an example of an offshore structure. The present invention is, however, not limited to this spar-type offshore structure and may be applied to any other offshore structures.

Figure 1:
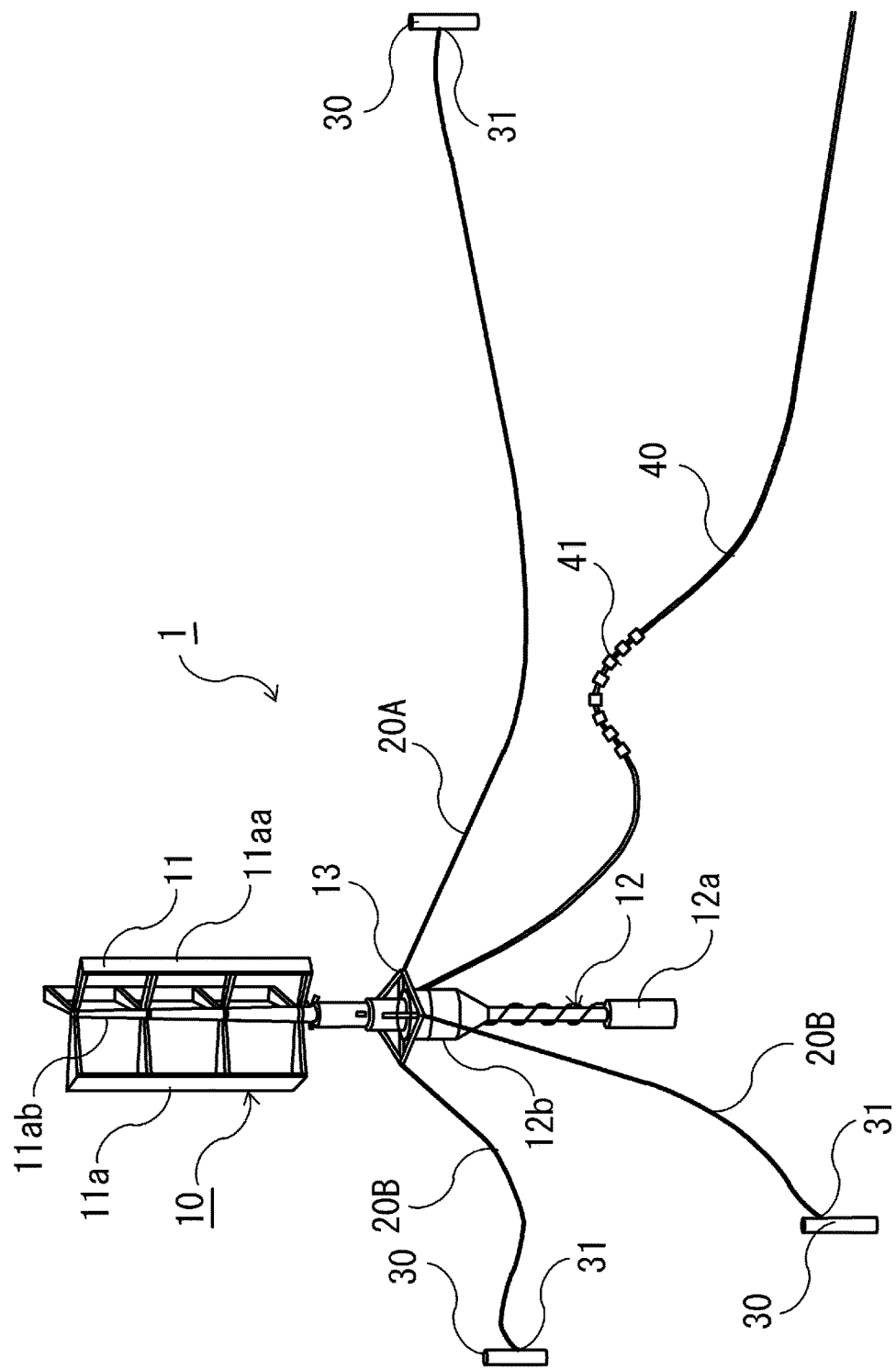
FIG. 1 is a schematic perspective view for explaining a system for mooring offshore structures of an embodiment according to the present invention.

As illustrated in FIG. 1, an offshore structure 10 of an embodiment illustrated herein is a spar-type offshore structure, including an upper structure 11 and a lower structure 12. The upper structure 11 includes: a vertical-axis wind wheel 11a having a rotary shaft 11ab and vertical blades 11aa; and a wind-wheel supporting portion 11b supporting the vertical-axis wind wheel 11a. The lower structure 12 includes a weight 12a and a buoyancy body 12b. In addition, a cable 40 with floats 41 is provided from the offshore structure 10 to on-shore instruments (not illustrated) for sending electric power generated and information obtained by various sensors (not illustrated) provided in the offshore structure 10 to the on-shore instruments and for receiving control signals for controlling the wind wheel from the on-shore instruments.

Then, in each of systems 2A to 2D (hereinafter, denoted collectively by 2) of embodiments according to the present invention, as shown by arrangement patterns A, B, C, D, E, F in FIGS. 2 to 7, for mooring an offshore structure group including a plurality of offshore structures 10A to 10D (hereinafter, denoted collectively by 10), the system includes mooring lines 20A, 20B, and 20C (hereinafter, denoted collectively by 20) arranged respectively in three to eight directions, and at least one of the offshore structures 10 in the offshore structure group is moored by locking the mooring lines 20, 20A, 20B in the respective directions with separate mooring bases 30. In addition, at least one of the mooring bases 30 locks the mooring lines 30 which are connected respectively to three to eight of the offshore structures 10 in the offshore structure group 10.

Moreover, a method for mooring an offshore structure group including a plurality of offshore structures 10 of embodiments according to the present invention is a method including: using mooring lines 20 arranged in three to eight directions, in which at least one of the offshore structure 10 in the offshore structure group is moored by locking the mooring lines 20 in the respective directions with separate mooring bases 30, and at least one of the mooring bases 30 locks the mooring lines 30 which are connected respectively to three to eight of the offshore structures 10 in the offshore structure group.

With this configuration, the plurality of offshore structures 10 are moored efficiently by a small number of the mooring lines 20 and a small number of the mooring bases 30. Specifically, defining the number of the mooring lines 20 between the offshore structures 10 and the mooring bases 30 enables a large number of the offshore structures 10 to be moored by a small number of the mooring bases 30 and a small number of the mooring lines 10. The mooring line 20 may be simply configured to impose only a catenary mooring force with the weight of the mooring line 20 itself, but may be provided as necessary with an intermediate sinker or an intermediate float to make the relation of the mooring force to a movement distance of the offshore structure 10 more appropriate.

Moreover, this combination of the respective arrangements of the offshore structures 10, the mooring bases 30, and the mooring lines 20 makes it possible to easily achieve such a combination that even if one of the mooring lines 20 mooring the offshore structure 10 is broken, the offshore structure 10 can be prevented from drifting by keep mooring of the offshore structure 10 with the group of the remaining two or more mooring lines 20.

Note that, if the number of the directions of the mooring lines 20 mooring the offshore structure 10 is less than three, that is, two or less, the movement range of the moored offshore structure 10 increases. Otherwise, attempt to decrease the movement range increases the mooring force required for the mooring lines 20, which is thus impractical. Particularly, in the case of two directions, when one of the mooring lines 20 is broken, the mooring is made by only one direction, resulting in a significant increase in the risk of colliding of the offshore structure with the adjacent offshore structure. On the other hand, if the number of the directions of the mooring lines 20 mooring the offshore structure 10 is nine or more, the numbers of the mooring lines 20 and the mooring bases 30 increase, thus increasing the cost, which is thus impractical.

In addition, regarding the mooring bases 30 as well, when less than two mooring lines 20 is provided for one mooring base 30, the number of the mooring bases 30 increases, thus increasing the cost. On the other hand, in the case of providing the mooring lines 20 connected respectively to nine offshore structures 10 or more, when part of the mooring lines 20 mooring the offshore structure 10 is broken and the offshore structure 10 moves, it is difficult to prevent the mooring lines 20 from intersecting each other at the mooring base 30. As a result, the mooring lines 20 are likely to intersect each other and to be broken, which is thus impractical.

In the system 2 for mooring an offshore structure group, the offshore structures 10 and the mooring bases 30 are arranged in such an asymmetrical arrangement pattern that in a case where one of the mooring lines 20 which moor one of the offshore structures 10 in the offshore structure group is broken, when the one offshore structure moves within a range allowed by the remaining mooring lines 20, the one offshore structure 10 is geometrically incapable of colliding with the other offshore structures 10.

With this configuration, a measure against the case where one of the mooring lines 20 is broken is achieved by the arrangements of the offshore structures 10 and the mooring bases 30 on the assumption that the offshore structures 10 move. This allows setting of smaller design strength of each mooring line 20 than that in the conventional technique. Therefore, it is possible to reduce the weight of each mooring line 20, facilitate the installation work for the mooring lines 20, and reduce the cost.

In addition, in the system 2 for mooring an offshore structure group, the offshore structures 10 and the mooring bases 30 are arranged in such an asymmetrical mooring arrangement pattern that in a case where a mooring function of one of the mooring bases 30 is lost, when any of the offshore structures 10 moored by the mooring lines 20 locked with the one mooring base 30 moves within a range allowed by the remaining mooring lines 20, the offshore structure 10 is geometrically incapable of colliding with the other offshore structures 10.

With this configuration, a measure against the case where the mooring function of one of the mooring bases 30 is lost is achieved by the arrangements of the offshore structures 10 and the mooring bases 30 on the assumption that the offshore structures 10 move. This allows setting smaller degree of fixing each mooring base 30, making it possible to reduce the weight of each mooring base 30, facilitate the installation work for the mooring bases 30, and reduce the cost.

In addition, regarding the arrangement of a plurality of the mooring bases 30 locked with the mooring lines 20 which moor the offshore structures 10, at least one of the offshore structures 10 is configured such that there are different mooring distances L1 and L2 among the mooring distances L between the at least one offshore structure 10 and the respective mooring bases 30, or such that there are different angles among angles $\alpha 1$, $\alpha 2$, and $\alpha 3$ made by the mooring lines 20 which moor the at least one offshore structure 10, when viewed from above.

With these configurations, the mooring line 20 in such a direction as to be highly likely to undergo the largest mooring force and be broken under the harshest weather and oceanographic conditions predictable, and the mooring lines 20 in the remaining two directions or more, which remain in the case of breakage of the above mooring line 20 and avoid drifting or moving of the offshore structure 10, are different roles. Accordingly, the setting of different directions for the mooring lines 20 or different lengths for the mooring lines 20 makes it possible to improve the mooring efficiency with appropriate lengths and strengths for the roles of the mooring lines 20. As a result, the cost for mooring can be reduced. From a different perspective, these configurations reduce the number of the mooring bases 30, and thus dramatically reduce the amount of work in offshore construction, which accounts for a large part of the cost of projects such as ocean wind power generation, and reduce the cost.

Furthermore, the offshore structure 10 moving due to breakage of the mooring line 20 or malfunction of the mooring base 30 can be prevented from moving toward the adjacent offshore structures 10. In other words, the movement direction of the offshore structure 10 which has started moving can be deflected from the adjacent offshore structures 10.

In addition, regarding the mooring distance L between the offshore structure 10 and the mooring bases 30, a difference $\Delta L$ between the large mooring distance L1 and the small mooring distance L2 is preferably equal to or larger than a diameter D of a circumscribed circle of a plane figure of the moored offshore structure 10 in a projection obtained by viewing the offshore structure 10 from above, and that the large mooring distance L1 is three times or less the small mooring distance L2. In short, "$\Delta L = L1 - L2 \geq D$, and $L1 \leq 3 \times L2$."

Note that, the mooring distance L is a horizontal distance from a locking position of the mooring line 20 at the offshore structure 10 to a fastening position of the mooring line 20 at the mooring base 30, and the circumscribed circle of the offshore structure 10 is a circumscribed circle at a position where the blades have the largest circumscribed circle, in the case of wind turbine, for example. Alternatively, if the offshore structure 10 has a portion protruding out to the periphery for mooring, the above circumscribed circle is a circumscribed circle in contact with a tip end of the protruding portion. In sum, a circumscribed circle having the largest diameter is employed as the circumscribed circle of the offshore structure 10.

With this configuration, since the magnitude of the mooring distance L is defined, the arrangement of the offshore structures 10 and the mooring bases 30 can be easily set according to this definition such that the offshore structure 10 moving due to breakage of the mooring line 20 or malfunction of the mooring base 30 is prevented from moving toward the adjacent offshore structure 10, within a practical range.

Next, more specific arrangement patterns will be described with reference to FIGS. 2 to 7. Here, arrangement patterns A, B, C, D provided with different mooring distances L and mooring directions in the arrangement of the offshore structures 10 by changing the lengths of the mooring lines, an arrangement pattern E provided with asymmetrical mooring angles in the arrangement of the offshore structures by changing the angles of the mooring lines, and a mixed arrangement pattern F will be illustrated. These arrangement patterns A to F are each configured as described below.

The systems 2A, 2B, 2C, and 2D for mooring an offshore structure group of the arrangement patterns A, B, C, D are configured as follows: regarding the arrangement of the plurality of mooring bases 30 locked with the mooring lines 20 which moor the offshore structures 10, at least one of the offshore structures 10 is such that there are different mooring distances L1 and L2 among the mooring distances between the at least one offshore structure 10 and the respective mooring bases 30 when viewed from above.

Figure 2:
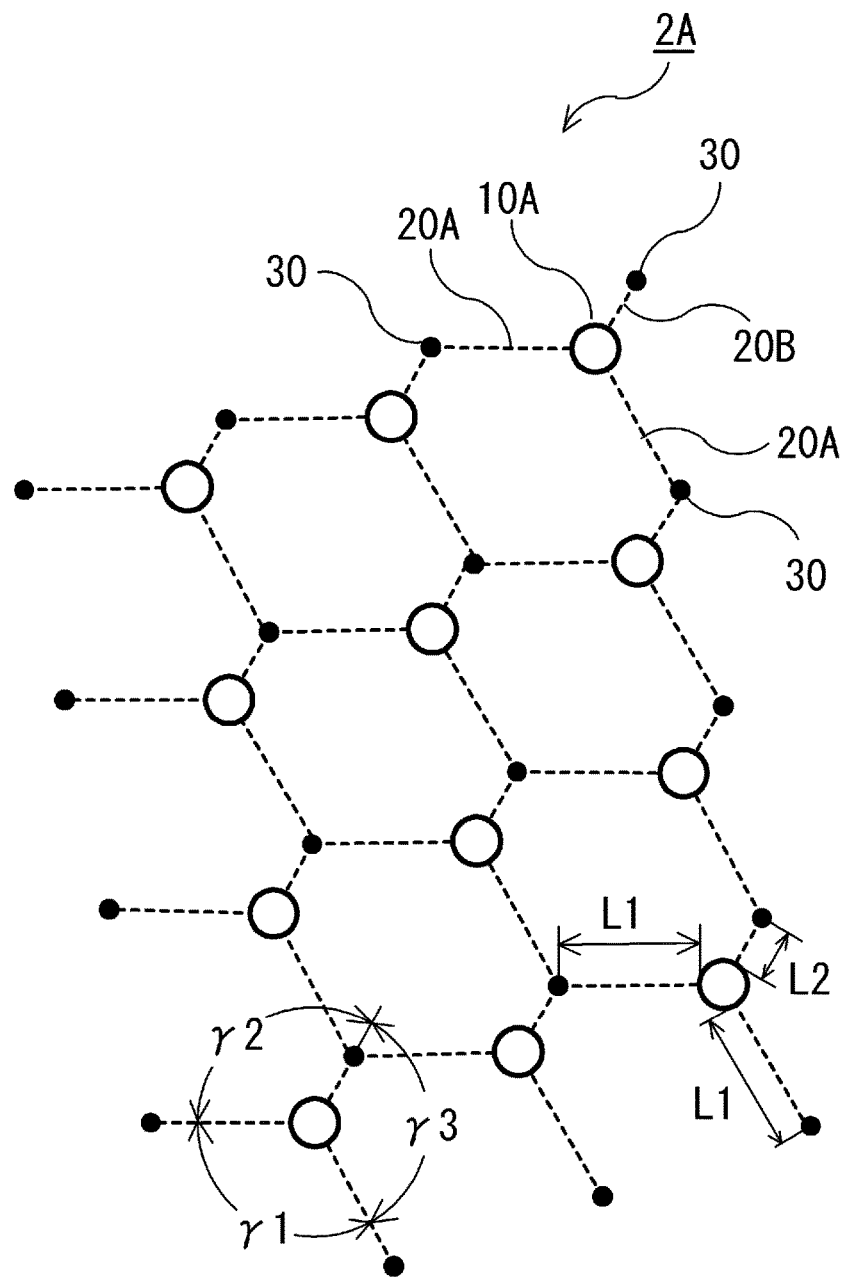
FIG. 2 is a schematic arrangement diagram for explaining an arrangement pattern A of a system for mooring offshore structures of an embodiment according to the present invention.
Figure 3:
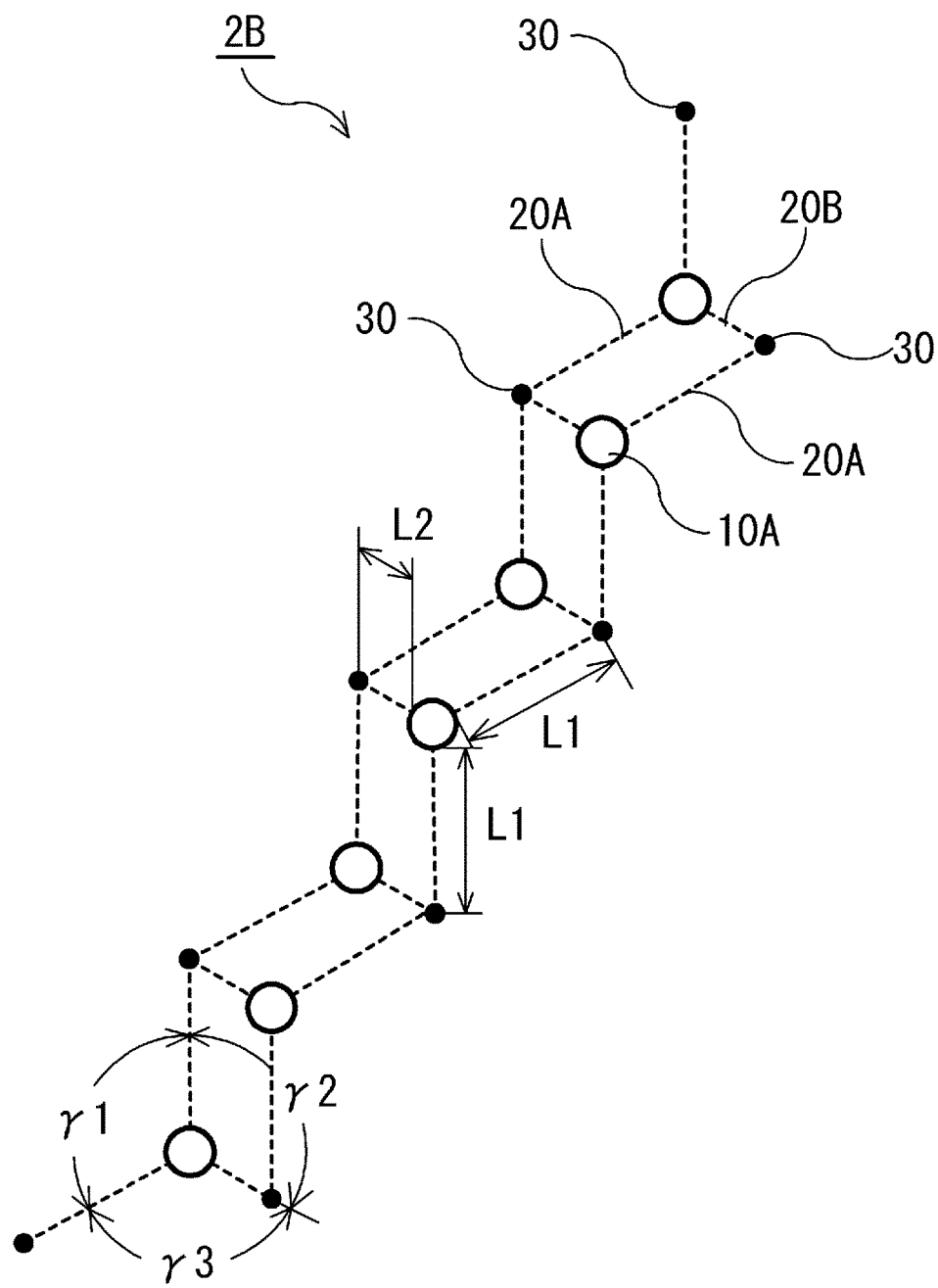
FIG. 3 is a schematic arrangement diagram for explaining an arrangement pattern B of a system for mooring offshore structures of an embodiment according to the present invention.

The system 2A for mooring an offshore structure group of the arrangement pattern A illustrated in FIG. 2 is configured such that each of the offshore structures 10A (single circle) is moored by two long mooring lines 20A each having a mooring distance of L1 and one short mooring line 20B having a mooring distance of L2, and the mooring directions of the short mooring lines 20B of each adjacent offshore structures 10 are oriented in opposite directions from each other. The system 2B for mooring an offshore structure group of the arrangement pattern B illustrated in FIG. 3 is configured such that while each of the offshore structures 10 is moored similarly by two long mooring lines 20A and one short mooring line 20B, the mooring directions of the short mooring lines 20B of each adjacent offshore structures 10 are oriented in the same direction. The arrangement pattern A is suitable for a water area having a relatively shallow water depth while the arrangement pattern B is suitable for a case where the offshore structures 10 are arranged in a row in a long and narrow water area available for installation, and the like.

Here, although L1>L2, the long mooring lines 20A do not necessarily have to have completely the same length, and it suffices that a difference between the long mooring lines 20A be about a third or less the difference ΔL between the mooring lines 20A and the mooring lines 20B. The same applies below.

Figure 4:
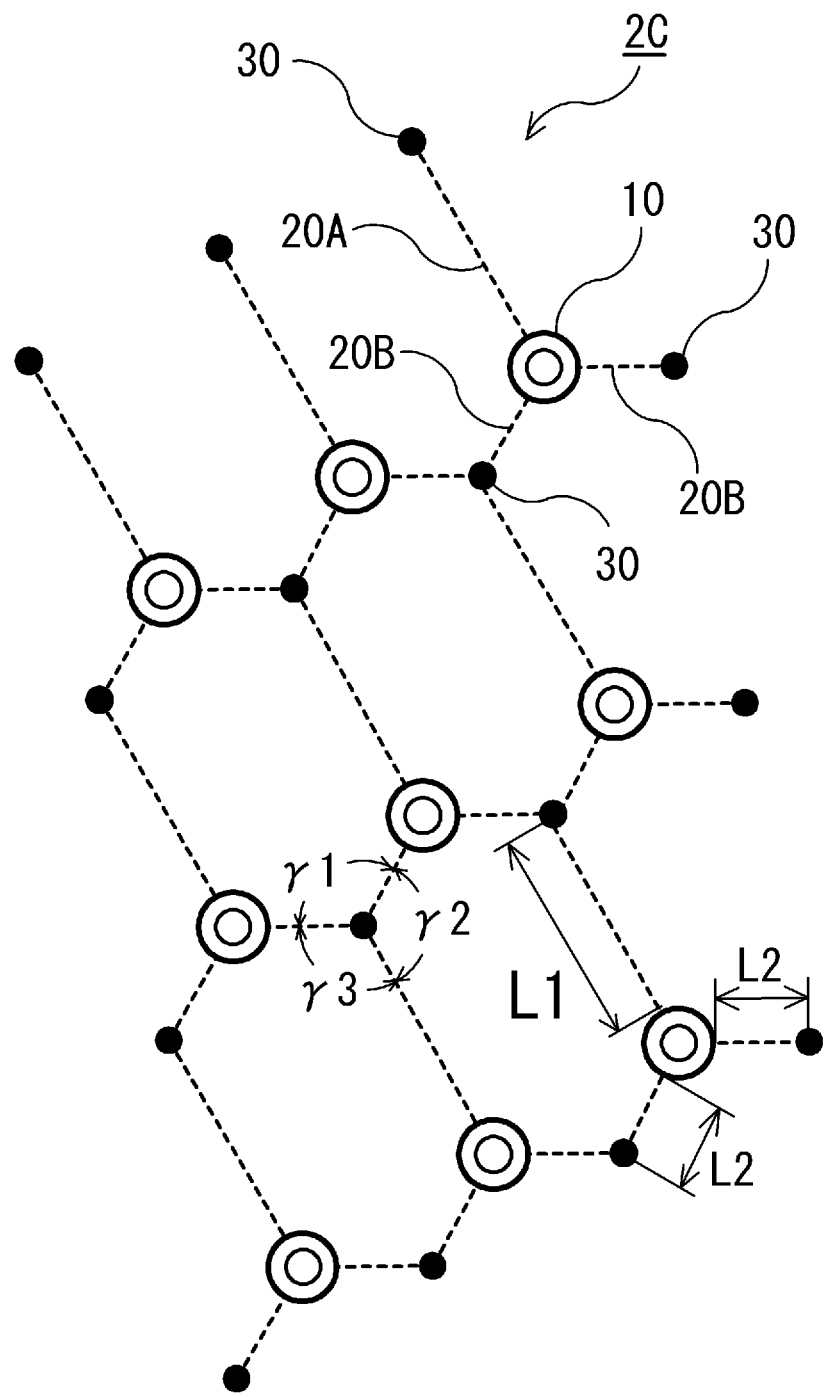
FIG. 4 is a schematic arrangement diagram for explaining an arrangement pattern C of a system for mooring offshore structures of an embodiment according to the present invention.
Figure 5:
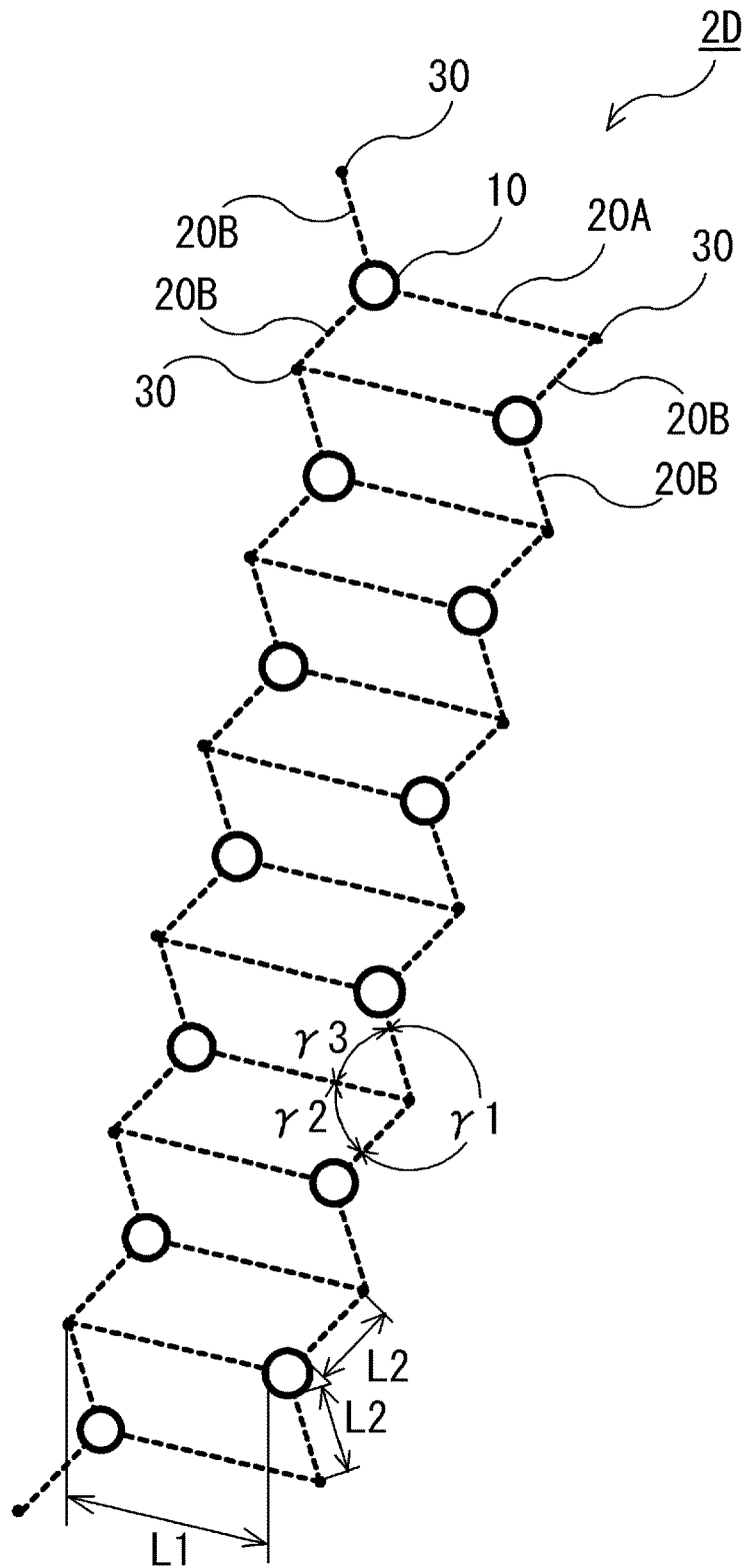
FIG. 5 is a schematic arrangement diagram for explaining an arrangement pattern D of a system for mooring offshore structures of an embodiment according to the present invention.

Meanwhile, the system 2C for mooring an offshore structure group of the arrangement pattern C illustrated in FIG. 4 is configured such that each of the offshore structures 10B (double circle) is moored by one long mooring line 20A having a mooring distance of L1 and two short mooring lines 20B each having a mooring distance of L2, and mooring directions of the long mooring lines 20A of each adjacent offshore structures 10 are oriented in opposite directions from each other. The system 2D for mooring an offshore structure group of the arrangement pattern D illustrated in FIG. 5 is configured such that while each of the offshore structures 10 is moored similarly by one long mooring line 20A and two short mooring lines 20B, mooring directions of the long mooring lines 20A of each adjacent offshore structures 10 are oriented in the same direction.

In addition, in the arrangement pattern C, angles γ2 and γ3 made by the long mooring line 20A and the short mooring lines 20B in each mooring base 30 are equal to or more than 90° while in the arrangement pattern D, angles γ2 and γ3 made by the long mooring line 20A and the short mooring lines 20B in each mooring base 30 are less than 90°. Note that γ2 and γ3 may be the same angle or may be different. In short, in the arrangement pattern C, L1>L2 as well as γ2≥90° and γ3≥90°. The arrangement pattern C is suitable for a water area having an intermediate water depth. On the other hand, in the arrangement pattern D, L1>L2 as well as γ2<90° and γ3<90°. The arrangement pattern D is suitable for a case where the offshore structures 10 are arranged in two rows in a long and narrow water area available for installation.

Figure 6:
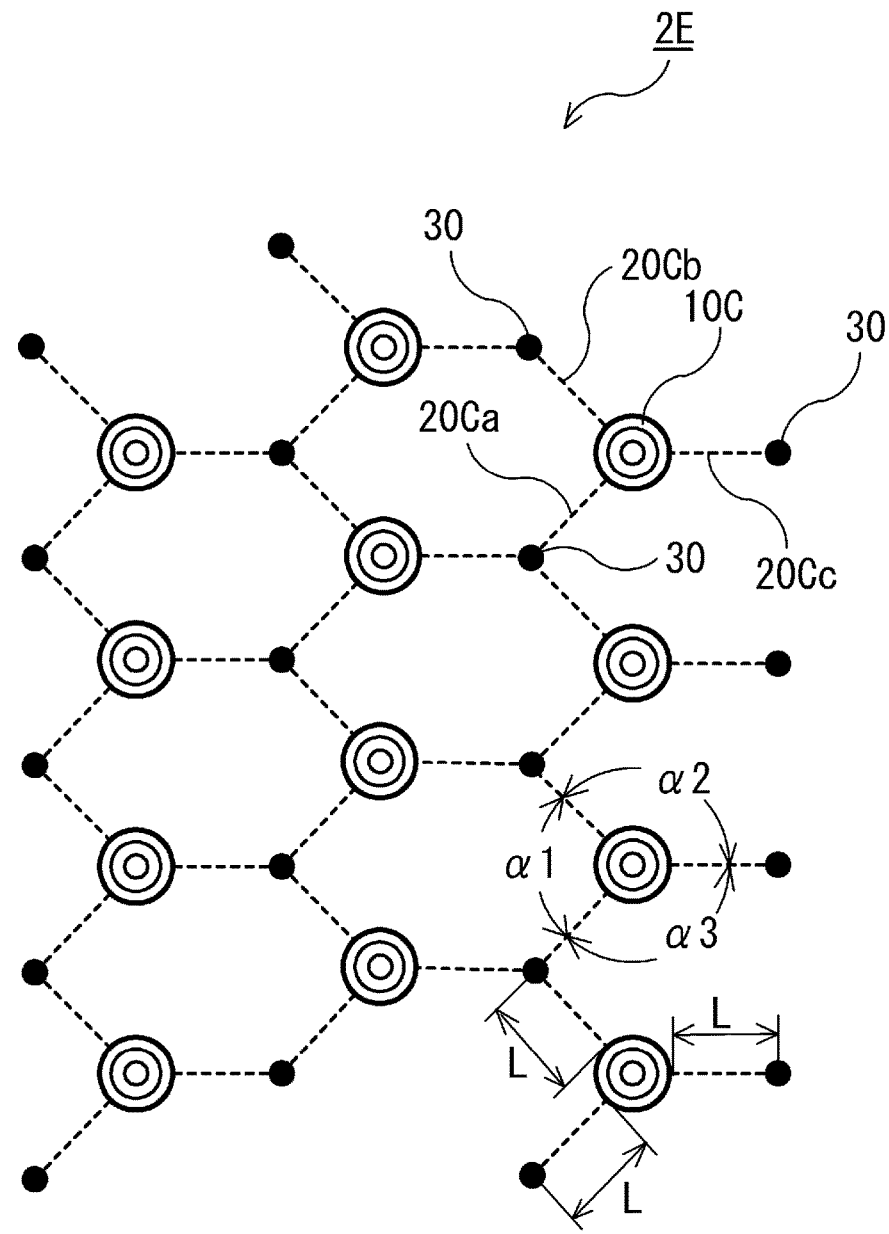
FIG. 6 is a schematic arrangement diagram for explaining an arrangement pattern E of a system for mooring offshore structures of an embodiment according to the present invention.

Moreover, as illustrated in FIG. 6, the system 2E for mooring an offshore structure group of the arrangement pattern E is configured such that regarding the arrangement of the plurality of mooring bases 30 locked with the mooring lines 20C which moor the offshore structures 10, at least one offshore structure 10C (triple circle) of the offshore structures 10 is such that there is a different angle among the angles α1, α2, and α3 made by the mooring lines 20C mooring the offshore structure 10C when viewed from above. In short, α1≠α2, or α2≠α3 or α1≠α3.

More specifically, the arrangement pattern E is configured such that each offshore structure 20C is moored by three, first to third mooring lines 20Ca to 20Cc, and that the angle α1 made by the first mooring lines 20Ca and the second mooring lines 20Cb is 80° or more, but less than 120°; the angle α2 made by the second mooring lines 20Cb and the third mooring lines 20Cc is 120° or more, but 140° or less; and the angles α3 made by the third mooring lines 20Cc and the first mooring lines 20Ca is 120° or more, but 140° or less. In short, 80°≤α1<120°, and 120°≤α2≤140°, and 120°≤α3≤140°. Note that the lengths or mooring distances of the first to third mooring lines 20Ca to 20Cc may be such that three of them are the same, two of them are the same except the other one, or three of them are different from one another.

Figure 7:
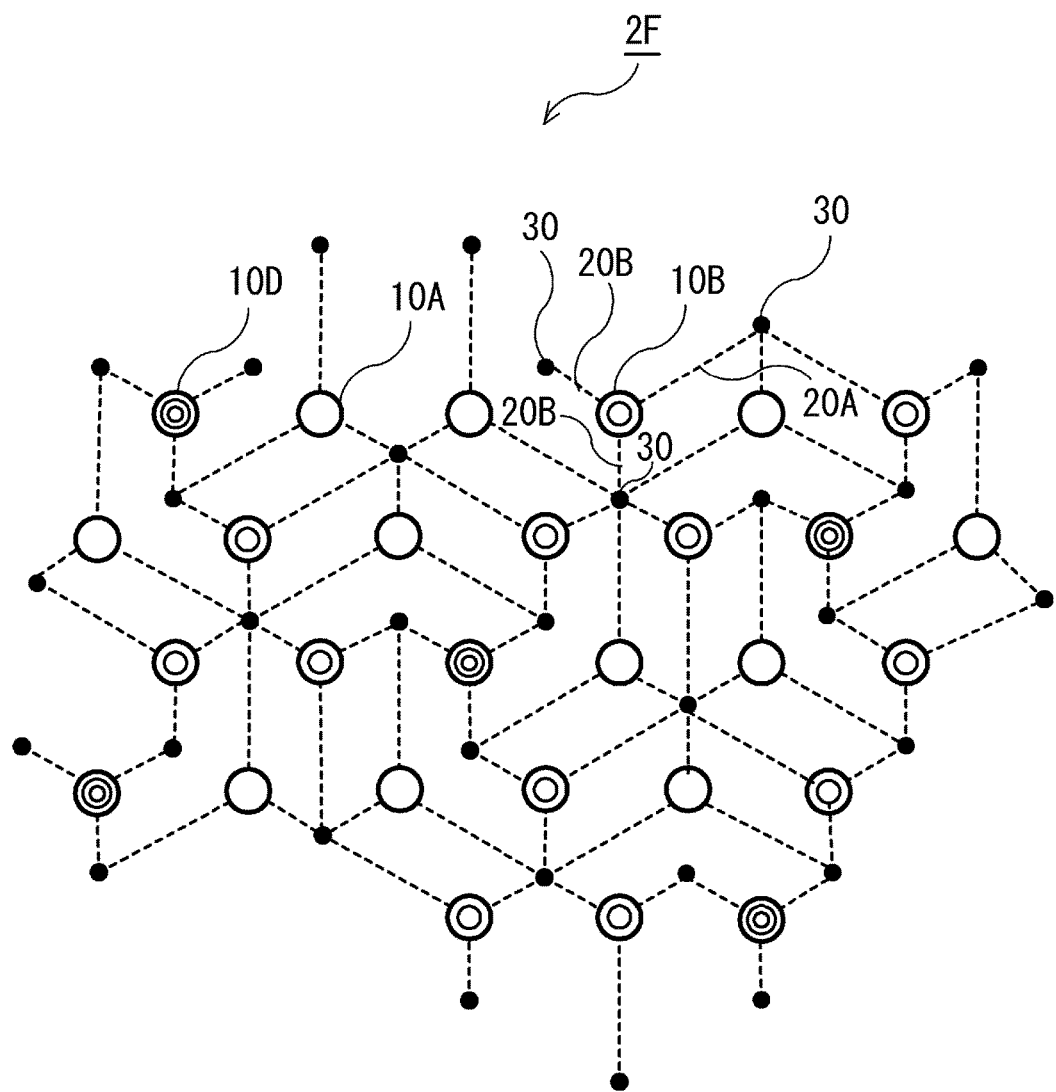
FIG. 7 is a schematic arrangement diagram for explaining an arrangement pattern F of a system for mooring offshore structures of an embodiment according to the present invention.

Then, as illustrated in FIG. 7, the arrangement pattern F of the mixed arrangement pattern is configured such that the offshore structures 10 are moored by the long mooring lines 20A and the short mooring lines 20B, and the offshore structures 10 include: an offshore structure 10A of a first type (single circle) which is moored by two of the long mooring line 20A and one of the short mooring line 20B; an offshore structure 10B of a second type (double circle) which is moored by one of the long mooring line 20A and two of the short mooring line 20B; and an offshore structure 10D of a third type (triple circle) which is moored by three of the short mooring line 20B. The arrangement pattern F is complicated but requires only a small number of the mooring bases, and is suitable for a water area having a relatively deep water depth.

The configuration of the arrangement pattern F seems to be complicated at a first glance. However, in terms of a lateral direction in the drawing (a left-to-right direction), the arrangement pattern F is configured such that on the side of the offshore structure 10D of the third type (triple circle) (NO. 1), two of the offshore structure 10B of the second type (double circle) (NO. 2 and NO. 3), one of the offshore structure 10A of the first type (single circle) (NO. 4), one of the offshore structure 10B of the second type (double circle) (NO. 5), two of the offshore structure 10A of the first type (single circle) (NO. 6 and NO. 7), and then the offshore structure 10D of the third type (triple circle) (next NO. 1) are sequentially connected. This arrangement with seven offshore structures 10 is repeated. In terms of a vertical direction in the drawing (up-to-down direction), the arrangement pattern F is configured such that NO. 1 of the next row is arranged between NO. 5 and NO. 6 of the upper row.

According to these arrangement patterns A, B, C, D, E, F, it is possible, by using a relatively simple geometrical pattern, to avoid a case where when one of the mooring lines 20 is broken, the offshore structure 10 moored by the remaining mooring lines 20 starts moving and collides with another offshore structure 10 until being pulled and stopped by the remaining mooring lines 20. Moreover, since the long mooring lines 20A can exert a larger mooring force than the short mooring lines 20B, the mooring lines 20 can be arranged efficiently and effectively by orienting the directions of the long mooring lines 20A in a direction in which a large external force acts, for example, a windward direction.

Therefore, by selecting and employing one of the arrangement patterns A, B, C, D, E, F in accordance with the wideness, water depth, the shape of the water bottom, and the like of an installation site for the offshore structure group, it is possible to easily achieve such an arrangement that even when part of the mooring lines 20 mooring the offshore structures 10 is broken or the mooring function of the mooring bases 30 is lost, although the offshore structure 10 moves, the offshore structure 10 is kept being moored by the remaining mooring-line group, so that the offshore structure 10 can be prevented from colliding with another offshore structure 10.

Figure 8:
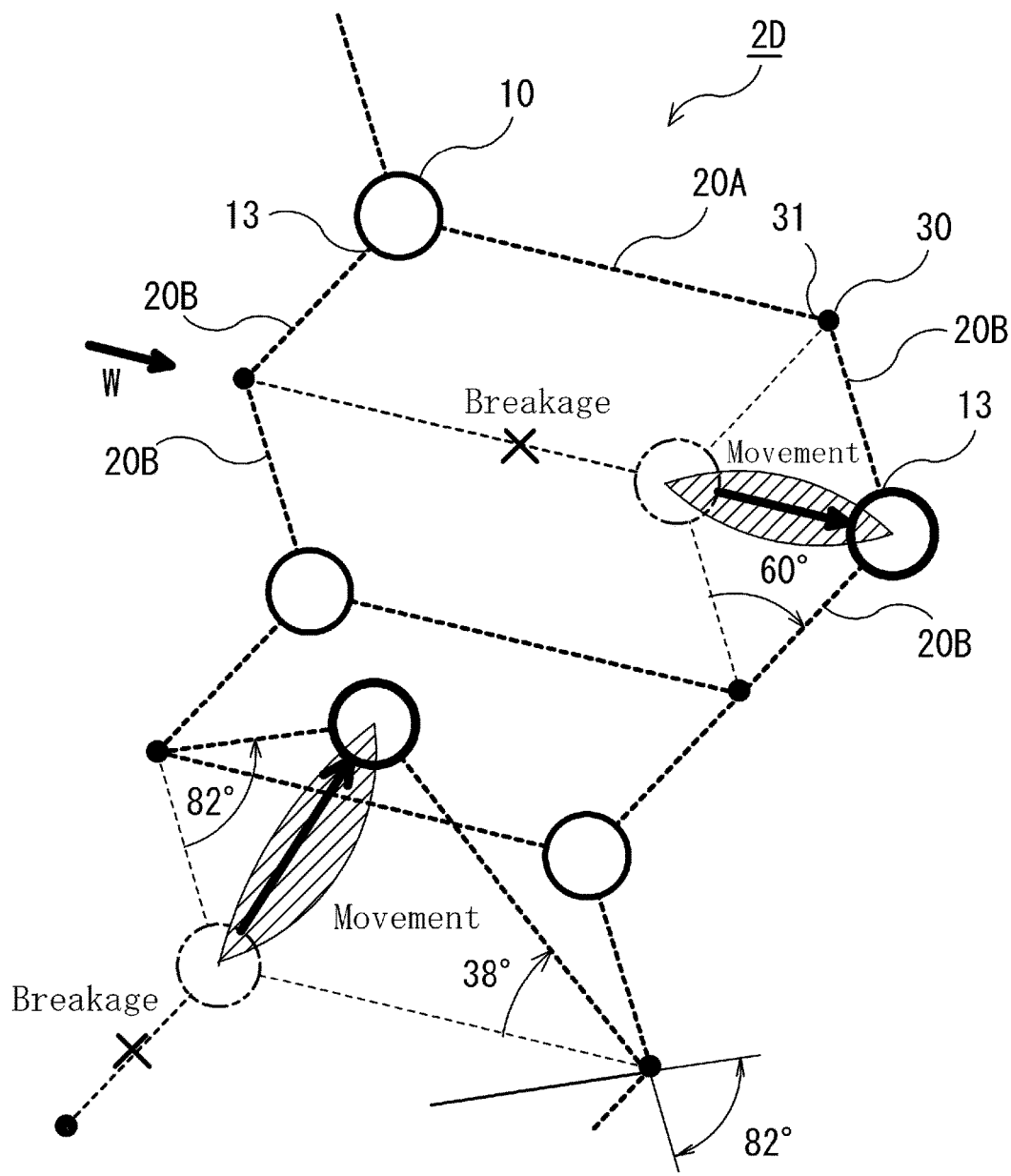
FIG. 8 is a diagram for explaining movement of an offshore structure when a mooring line is broken in the arrangement pattern D.

Here, FIG. 8 illustrates what happens when one of the mooring lines 20A, 20B is broken in the arrangement pattern D. As illustrated in an upper part of the drawing in FIG. 8, when the long mooring line 20A is broken, the offshore structure 10, which was moored by this long mooring lines 20A, can move without colliding with another offshore structure 10 until the offshore structure 10 moves within an allowable movement range (within the hatching) and is stopped by being pulled by the remaining short mooring lines 20B. In FIG. 8, since γ1, γ2, and γ3 are all 120°, the short mooring line 20B turns by 60° about the mooring base 30.

Moreover, as illustrated in a lower part of the drawing in FIG. 8, when the short mooring line 20B is broken, the offshore structure 10, which was moored by this short mooring line 20B, can move without colliding with another offshore structure 10 until the offshore structure 10 moves within an allowable movement range (within the hatching) and is stopped by being pulled by the remaining long mooring line 20A and short mooring line 20B. In this case, the remaining short mooring line 20B turns by 82° about the mooring pile 30 and the remaining long mooring lines 20A turns by 38° about the mooring pile 30.

In this case, since the long mooring lines 20A can exert a larger mooring force than the short mooring lines 20B, the mooring lines 20A, 20B can be arranged efficiently and effectively by orienting the directions of the long mooring lines 20A in a direction in which a large external force acts, for example, a windward direction of a wind W and an upstream direction of tidal currents.

Next, the configuration of the mooring bases 30 for implementing the above-described arrangement patterns, a mooring-line fastening device 31 for mooring lines 20 on the mooring bases 30 side, and a mooring locking device 13 at a connection portion on the offshore structure 10 side will be described.

Figure 9:
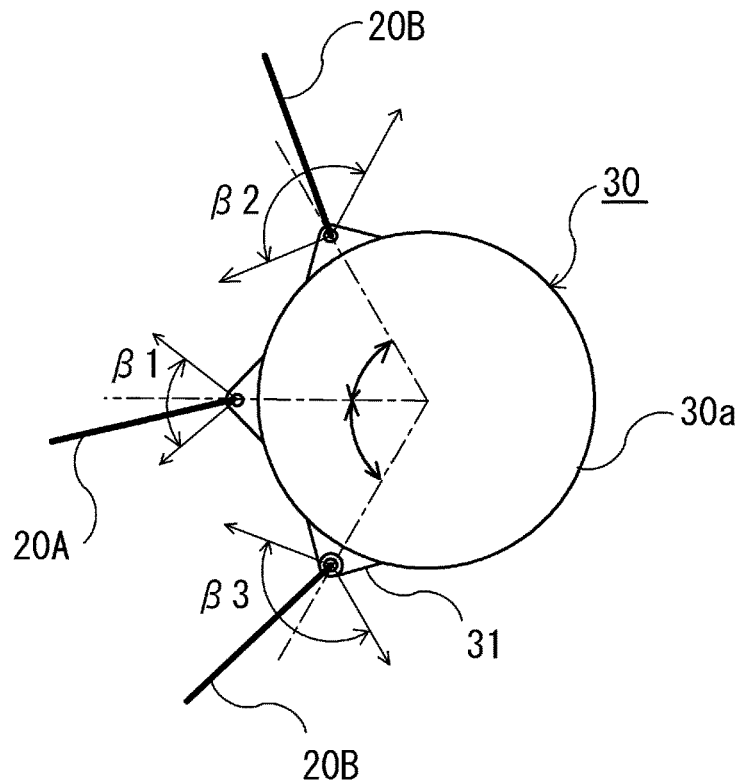
FIG. 9 is a diagram of a mooring pile viewed from above, and schematically illustrating a method for swingably fixing the mooring line and a swingable range of the mooring line.
Figure 10:
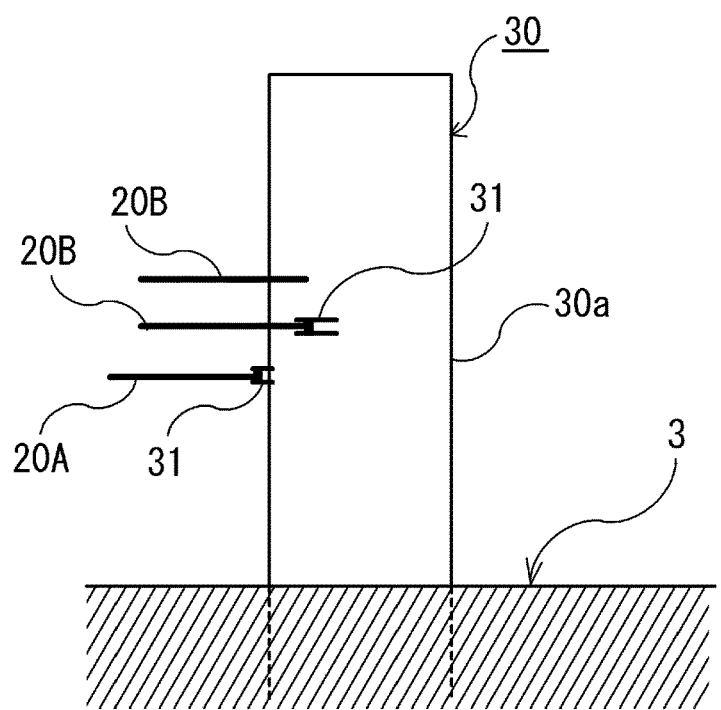
FIG. 10 is a diagram of the mooring pile viewed from a side, and schematically illustrating a difference in height of mooring positions of the mooring lines.
Figure 11:
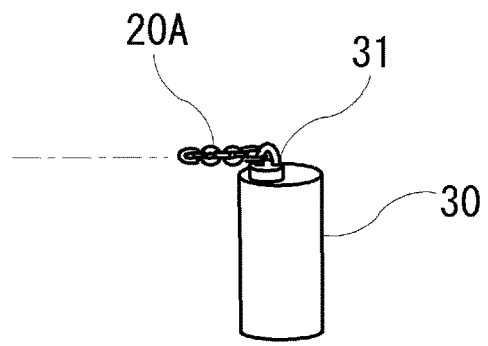
FIG. 11 is a diagram illustrating a case where a mooring base is constructed by providing one mooring-line fastening device on an upper surface of a columnar body.
Figure 12:
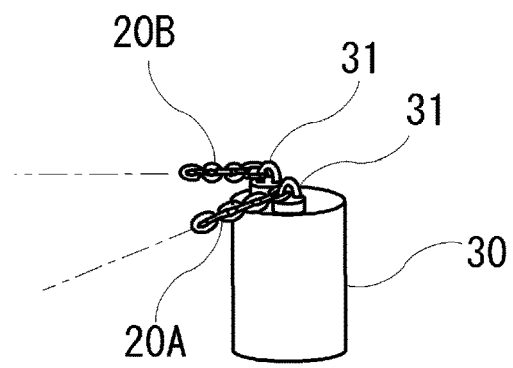
FIG. 12 is a diagram illustrating a case where a mooring base is constructed by providing two mooring-line fastening devices on an upper surface of a columnar body.
Figure 13:
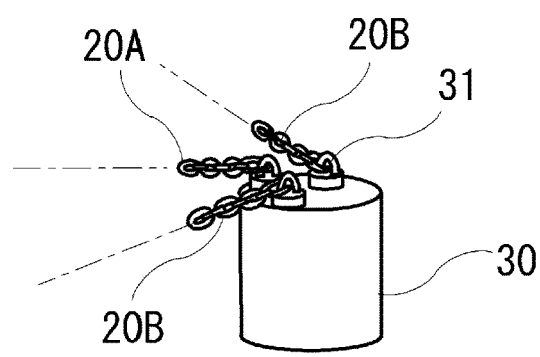
FIG. 13 is a diagram illustrating a case where a mooring base is constructed by providing three mooring-line fastening devices on an upper surface of a columnar body.
Figure 14:
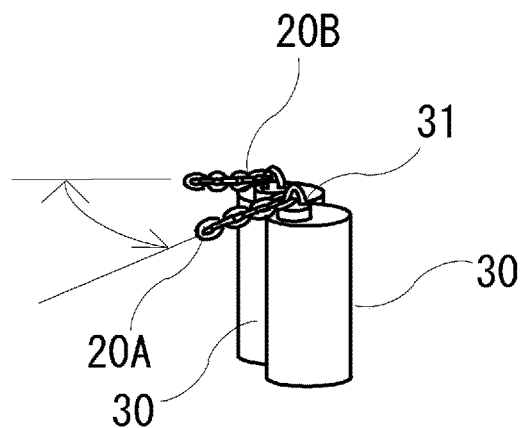
FIG. 14 is a diagram illustrating a configuration in which two mooring bases each having one mooring-line fastening device provided on a columnar body are bundled.
Figure 15:
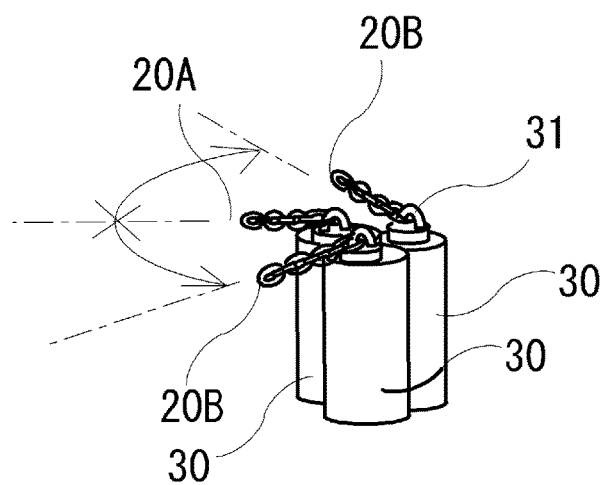
FIG. 15 is a diagram illustrating a configuration in which three mooring bases each having one mooring-line fastening device provided on a columnar body are bundled.

As illustrated in FIGS. 9 and 10, the mooring base 30 for fixing the mooring lines 20A, 20B on the side of the water bottom are formed of a mooring pile 30. At the mooring pile 30, each of the mooring lines 20A, 20B is locked with a mooring-line fastening device 31 provided on a side surface or a corner of a columnar body 30a provided upright on the water bottom 3. The mooring-line fastening device 31 is fixed to the columnar body 30a of the mooring pile 30 in such a manner as to be swingable in a horizontal direction. Note that as illustrated in FIGS. 11 to 13, the mooring-line fastening device 31 may be provided on an upper surface of the columnar body 30a while as illustrated in FIGS. 14 and 15, the columnar bodies 30a provided with the mooring-line fastening devices 31 on the upper surfaces thereof may be bundled.

Thus, even when the mooring direction is changed by turning, a change in the mooring force is smaller than the case where the mooring base 30 is formed of a drag anchor. In addition, with such a very simple structure as the swinging of the mooring-line fastening device 31, a large turnable range β of each mooring line 20A, 20B can be taken at the locking portion on the mooring bases 30 side when viewed from above. Moreover, since the mooring-line fastening device 31 with which the mooring line 20A, 20B is locked is swingable, even when the offshore structure 10 moves from the initially moored position to change the mooring directions of the mooring lines 20 due to breakage of part of the mooring line 20A, 20B or lost of the mooring function of the mooring base 30, it is possible to prevent a large force from being applied to the mooring line 20A, 20B and the columnar body 30a of the mooring pile 30.

Then, as illustrated in FIG. 9, the turnable ranges β (β1, β2, β3) of the mooring lines 20 at the licking portions on the mooring bases 30 side when viewed from above are configured to be 5° or more. Thus, the turnable ranges β of the mooring lines 20A, 20B at the portions of the mooring-line fastening device 31, which are the locking portions, when viewed from above, in other words, in a plan view are increased. Note that the upper limit of the turnable range β is up to about 180° When the is provided on the side surface, and is up to about 360° when the mooring-line fastening device 31 is provided on the upper surface, if possible such that the turning can be made unlimitedly as many times as desired.

At the mooring base 30 with which the long mooring line 20A and the short mooring line 20B are locked, a locking position of the long mooring line 20A is located lower than a locking position of the short mooring line 20B. Specifically, as illustrated in FIG. 10, at the mooring pile 30, the mooring position of the mooring line 20A extending in a center direction among adjacent three directions is located lowest. Moreover, the mooring positions of the mooring lines 20B extending on the remaining directions on the adjacent sides are preferably located at mutually different heights. Note that, as illustrated in FIGS. 12 and 13, when the mooring-line fastening device 31 is provided on the upper surface of the columnar body 30a, the above-described configuration may be easily achieved by changing the height of the platform portion of the mooring-line fastening device 31. Meanwhile, as illustrated in FIGS. 14 and 15, when the columnar bodies 30a each provided with the single mooring-line fastening device 31 on the upper surface are bundled, the above-described configuration may be easily achieved similarly by changing the height of the platform portion of the mooring-line fastening device 31.

Thus, in the above-described arrangement patterns B, D, F, when part of the mooring line 20A, 20B is broken or the mooring function of the mooring base 30 is lost, there is a possibility that the mooring direction of the short mooring line 20B is largely changed to go beyond the long mooring line 20A connected to the same mooring base 30, but there is no possibility that the mooring direction of the long mooring line 20A is largely changed to go beyond the short mooring line 20B connected to the same mooring base 30. For this reason, even when the offshore structure 10 moves from the initially moored position to largely change, the mooring direction of any of the mooring line 20A, 20B extending in a central direction and the mooring lines 20A, 20B extending in adjacent directions due to breakage of part of the mooring line 20A, 20B or loss of the mooring function of the mooring bases 30, the mooring directions can be changed without interfering with each other. Therefore, even when the mooring line 20A (or 20B) in one direction which moors the offshore structure 10 is broken, and the mooring directions of the remaining mooring lines 20B (or 20A) are changed, it is possible to avoid twining of the long mooring line 20A and the short mooring line 20B, and to thus prevent the mooring lines 20A, 20B from damaging.

In addition, each mooring line 20A, 20B is locked with the mooring locking device 13 at the connection portion on the offshore structure 10 side, and the mooring locking device 13 is fixed to the offshore structure 10 in such a manner as to be swingable in the horizontal direction. Thus, with such a very simple structure as the swinging of the mooring locking device 13, a large turnable range of each mooring line 20 can be taken at the connection portion on the offshore structure 10 side when viewed from above. In addition, since the mooring locking device 13 with which the mooring line 20 is locked is swingable, even when the offshore structure 10 moves from the initially moored position to change the mooring directions of the mooring lines 20 due to breakage of part of the mooring lines 20 or loss of the mooring function of the mooring base 30, it is possible to prevent a large force from being applied to the mooring lines 20 and the mooring locking device 13.

Accordingly, with such a very simple structure as the swinging of the mooring-line fastening device 31 and the swinging of the mooring locking device 13, a large turnable range of each mooring line 20 can be taken. Therefore, even when the offshore structure 10 moves from the initially moored position to change the mooring directions of the mooring lines 20 due to breakage of part of the mooring lines 20 or loss of the mooring function of the mooring base 30, it is possible to prevent a large force from being applied to the mooring lines 20, the columnar body 30*a*, and the mooring locking device 13. In addition, the mooring lines 20 can change their mooring directions without interfering with each other, so that twining and damaging of the mooring lines 20 can be avoided.

According to this configuration using the swingable mooring-line fastening device 31 and the swingable mooring locking device 13, the present invention can configure to set a large turnable range of the mooring lines 20 at both of the connection portion and the locking portion when viewed from above, in other words, in a plan view, while the conventional technique is configured such that the mooring direction is set in advance, and the mooring line 20 is fixedly connected in the previously-set mooring direction, and the mooring line 20 is fixedly supported in one direction at the connection portion on the offshore structure 10 side and the locking portion on the mooring base 30 side.

Thus, even if part of the mooring lines 20 mooring the offshore structures 10 is unexpectedly broken, it is possible to permit a large change in the mooring direction of each mooring line 20 of the remaining mooring-line group at the connection portion on the offshore structure 10 side and a large change in the mooring direction thereof at the locking portion on the mooring base 30 side, accompanying the movement of the offshore structure 10, making it possible to keep mooring the offshore structure 10 with the remaining mooring-line group, and to prevent the mooring lines 20 from damaging when avoiding the drifting of the offshore structure 10.

Figure 16:
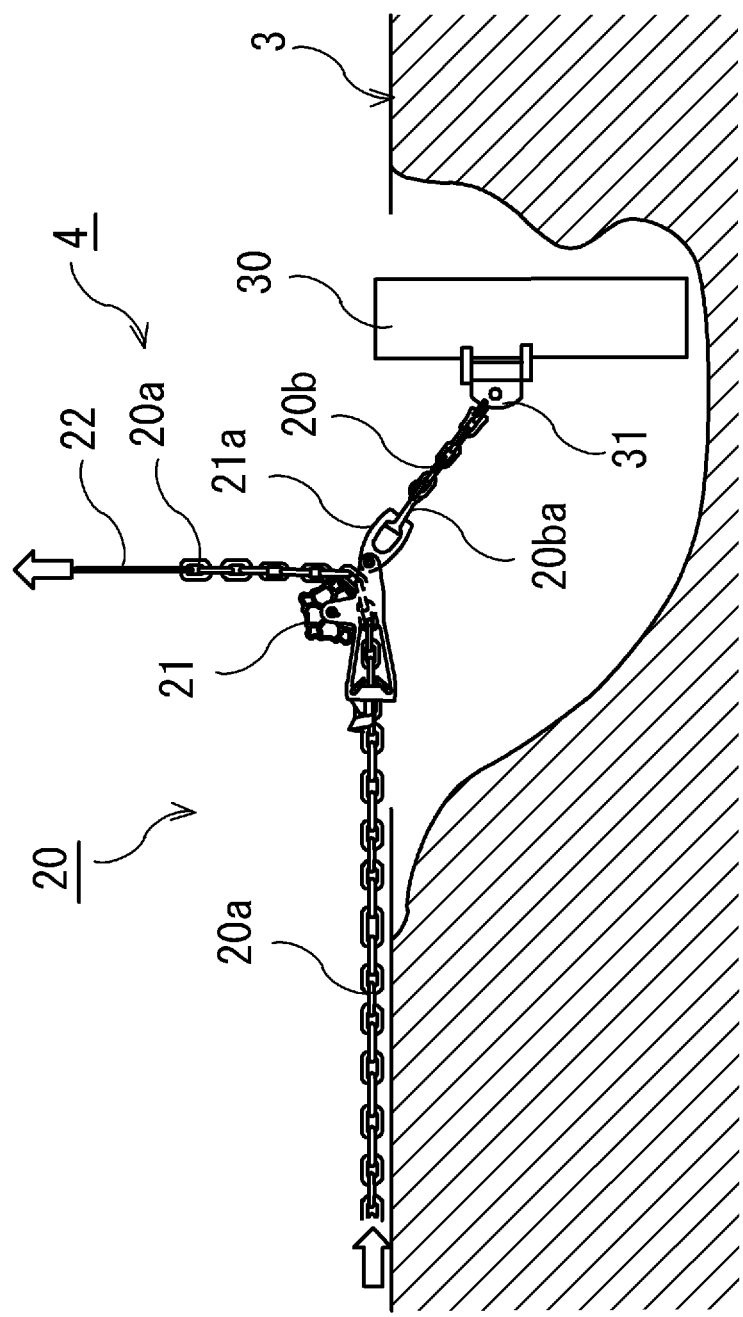
FIG. 16 is a diagram schematically illustrating a configuration of a mooring mechanism for adjusting a length of a mooring line.

Moreover, as illustrated in FIG. 16, the lengths of the mooring lines 20A, 20B are adjusted to adjust the mooring tensions of the mooring lines 20A, 20B. This length adjustment may be performed as follows. Here, the same mechanism and method of length adjustment is applied to both mooring lines 20A, 20B, the description will be made collectively for the mooring lines 20.

A mooring mechanism 4 for the length adjustment includes: the mooring line 20 formed while being separated into a main mooring line 20*a* and a sub mooring line 20*b*; the mooring-line fastening device 31 of the mooring pile (mooring base) 30 which is disposed in the water and locks one end of the sub mooring line 20*b*; and a length adjusting device 21 configured to adjust the length of the main mooring line 20*a*.

In addition, a first engagement portion 20*ba* is provided on the other end of the sub mooring line 20*b*. Moreover, a second engagement portion 21*a* configured to be engaged with the first engagement portion 20*ba* is provided on the length adjusting device 21 configured to adjust the length of the main mooring line 20*a*. Then, the length adjusting device 21 is attached to the other end of the main mooring line 20*a* fixed at one end to the offshore structure 10. The second engagement portion 21*a* of the length adjusting device 21 is engaged with the first engagement portion 20*ba* to connect the offshore structure 10 and the mooring-line fastening device 31 through the main mooring line 20*a*, the length adjusting device 21, the second engagement portion 21*a*, the first engagement portion 20*ba*, and the sub mooring line 20*b*, so that the length of the main mooring line 20*a* can be adjusted by the length adjusting device 21.

Next, the length adjustment for the mooring line 20 performed by using the mooring mechanism 4 will be described. The mooring line 20 is formed while being separated into the main mooring line 20*a* and the sub mooring line 20*b*. One end of the sub mooring line 20*b* is locked with the mooring-line fastening device 31 and the first engagement portion 20*ba* is provided on the other end of the sub mooring line 20*b*. On the other hand, the second engagement portion 21*a* configured to be engaged with the first engagement portion 20*ba* is provided on the length adjusting device 21 configured to adjust the length of the main mooring line 20*a*.

Moreover, the length adjusting device 21 is provided on the other end of the main mooring line 20*a* fixed at one end to the offshore structure 10, so that the length of the main mooring line 20*a* can be adjusted by the length adjusting device 21. The length adjustment is made such that a mooring chain of the main mooring line 20*a* is passed through the length adjusting device 21 and a desired ring of the mooring chain can be locked by a clasp. When the mooring pile 30 is buried in the water bottom, one end of the sub mooring line 20*b* is fastened to the mooring-line fastening device 31 of the mooring pile 30.

Then, when the offshore structure 10 is moored, the other end side of the main mooring line 20*a*, which is fixed at one end to the offshore structure 10, is passed through the length adjusting device 21 and the other end thereof is supported by an auxiliary line 22. In this state, the length adjusting device 21 is moved to the mooring pile 30 by an underwater robot (not illustrated) or the like, and the second engagement portion 21*a* of the length adjusting device 21 is engaged with the first engagement portion 20*ba*.

Thus, the offshore structure 10 and the mooring-line fastening device 31 are connected through the main mooring line 20*a*, the length adjusting device 21, the second engagement portion 21*a*, the first engagement portion 20*ba*, and the sub mooring line 20*b*. After the connection, the auxiliary line 22 or the main mooring line 20*a* is pulled and the length of the main mooring line 20*a* is adjusted while the mooring tension, the mooring length, or the position of the offshore structure 10 is being measured. Then, the length of the main mooring line 20*a* is fixed at the length adjusting device 21.

In other words, the mooring line 20 is formed while being separated into the main mooring line 20*a* and the sub mooring line 20*b*. The second engagement portion 21*a*, which is configured to be engaged with the first engagement portion 20*ba* provided on the other end of the sub mooring line 10*b* locked at one end with the mooring-line fastening device 31, is provided on the length adjusting device 21 configured to adjust the length of the main mooring line 20*a*. The length adjusting device 21 is provided on the other end of the main mooring line 10*a*, which is fixed at one end to the offshore structure 10. Then, the second engagement portion 21*a* of the length adjusting device 21 is engaged with the first engagement portion 20*ba*, so that the offshore structure 10 and the mooring-line fastening device 31 are connected through the main mooring line 20*a*, the length adjusting device 21, the second engagement portion 21*a*, the first engagement portion 20*ba*, and the sub mooring line 20*b*. Thereafter, the length of the main mooring line 20*a* is adjusted by the length adjusting device 21.

The length of the main mooring line 20a is set as follows. For example, when the offshore structure 10 is moored by the mooring lines 20A, 20B in three directions, much accuracy is not required for the installation position of the offshore structure 10. For this reason, the mooring lengths of the short mooring lines 20B in two directions are first set, and the short mooring lines 20B are set at the set lengths on the onshore or installation site, and then are connected to the mooring pile 30. Since the length adjustment is unnecessary for the short mooring lines 20B, an expensive length adjusting device 21 is unnecessary to be used. After the short mooring lines 20B are connected to the mooring pile 30, the long mooring line 20A is connected to the mooring pile 30 and adjusted in length in the above-described procedures.

As described so far, according to the system 2 for mooring an offshore structure group and the method for mooring an offshore structure group of the present invention, in the mooring of the offshore structure group with a wind turbine or the like mounted thereon, even when part of the mooring lines 30 mooring the offshore structure 10 is broken under harsh weather and oceanographic conditions, although the offshore structure 10 moves, but the offshore structure 10 is kept being moored by the remaining mooring-line group, so that the offshore structure 10 can be prevented from drifting or colliding with another offshore structure 10, thus making it possible to moor the offshore structure 10 at the offshore installation site safely without excessively increasing the strength of the mooring lines 20 in the mooring directions.

INDUSTRIAL APPLICABILITY

According to the system for mooring an offshore structure group and the method for mooring an offshore structure group of the present invention, even when part of the mooring lines mooring the offshore structure is broken under harsh weather and oceanographic conditions, although the offshore structure moves, the offshore structure is kept being moored by the remaining mooring-line group, so that the offshore structure can be prevented from drifting or colliding with another offshore structure, thus making it possible to moor the offshore structure at the offshore installation site safely without excessively increasing the strength of the mooring lines in the mooring directions. Therefore, the system and method can be employed in the case of mooring a large number of offshore structures, such as offshore structures with a wind turbine and the like mounted thereon.

EXPLANATION OF REFERENCE NUMERALS 2, 2A, 2B, 2C, 2D, 2E, 2F system for mooring an offshore structure group
3 water bottom
4 mooring mechanism
10, 10A, 10B, 10C, 10D offshore structure
11 upper structure
11a vertical-axis wind wheel
11aa vertical blade
11ab rotary shaft
12 lower structure
12a weight
12b buoyancy body
13 mooring locking device
20, 20A, 20B mooring line
20a main mooring line
20b sub mooring line
20ba first engagement portion
21 length adjusting device
21a second engagement portion
30 mooring pile (mooring base)
31 mooring-line fastening device

The invention claimed is:
1. A system for mooring a group of offshore structures, comprising:
a plurality of mooring lines, arranged in three to eight radial directions from one offshore structure of the group of offshore structures, and
a plurality of mooring bases,
wherein the one offshore structure of the group of offshore structures is fastened to three to eight of the plurality of mooring lines, to thereby moor the one offshore structure to respective mooring bases of the plurality of mooring bases,
wherein at least one of the mooring bases of the plurality of mooring bases is fastened to three to eight of the plurality of mooring lines, to thereby moor the at least one of the mooring bases to three to eight offshore structures of the group of offshore structures,
wherein the offshore structures and the mooring bases are arranged in such an asymmetrical arrangement pattern that, in a case where one of the mooring lines which moor the one offshore structure in the group of offshore structures is broken, when the one offshore structure moves within a range allowed by the remaining mooring lines, the one offshore structure is geometrically incapable of colliding with the other offshore structures,
wherein each of the offshore structures is moored by two long mooring lines and one short mooring line among the plurality of mooring lines, and
wherein mooring directions of the short mooring lines of each adjacent ones of the offshore structures are oriented in the same radial direction of the offshore structure.
2. A system for mooring a group of offshore structures, comprising:
a plurality of mooring lines, arranged in three to eight radial directions from one offshore structure of the group of offshore structures, and
a plurality of mooring bases,
wherein the one offshore structure of the group of offshore structures is fastened to three to eight of the plurality of mooring lines, to thereby moor the one offshore structure to respective mooring bases of the plurality of mooring bases,
wherein at least one of the mooring bases of the plurality of mooring bases is fastened to three to eight of the plurality of mooring lines, to thereby moor the at least one of the mooring bases to three to eight offshore structures of the group of offshore structures,
wherein the offshore structures and the mooring bases are arranged in such an asymmetrical arrangement pattern that, in a case where one of the mooring lines which moor the one offshore structure in the group of offshore structures is broken, when the one offshore structure moves within a range allowed by the remaining mooring lines, the one offshore structure is geometrically incapable of colliding with the other offshore structures,
wherein each of the offshore structures is moored by two long mooring lines and one short mooring line among the plurality of mooring lines, and wherein mooring directions of the short mooring lines of each adjacent ones of the offshore structures are oriented in opposite radial directions of the offshore structure from each other.

3. A system for mooring a group of offshore structures, comprising:
   a plurality of mooring lines, arranged in three to eight radial directions from one offshore structure of the group of offshore structures, and
   a plurality of mooring bases,
   wherein the one offshore structure of the group of offshore structures is fastened to three to eight of the plurality of mooring lines, to thereby moor the one offshore structure to respective mooring bases of the plurality of mooring bases,
   wherein at least one of the mooring bases of the plurality of mooring bases is fastened to three to eight of the plurality of mooring lines, to thereby moor the at least one of the mooring bases to three to eight offshore structures of the group of offshore structures,
   wherein the offshore structures and the mooring bases are arranged in such an asymmetrical arrangement pattern that, in a case where one of the mooring lines which moor the one offshore structure in the group of offshore structures is broken, when the one offshore structure moves within a range allowed by the remaining mooring lines, the one offshore structure is geometrically incapable of colliding with the other offshore structures,
   wherein each of the offshore structures is moored by one long mooring line and two short mooring lines among the plurality of mooring lines, and
   wherein mooring directions of the long mooring lines of each adjacent ones of the offshore structures are oriented in the same radial direction of the offshore structure.

4. A system for mooring a group of offshore structures, comprising:
   a plurality of mooring lines, arranged in three to eight radial directions from one offshore structure of the group of offshore structures, and
   a plurality of mooring bases,
   wherein the one offshore structure of the group of offshore structures is fastened to three to eight of the plurality of mooring lines, to thereby moor the one offshore structure to respective mooring bases of the plurality of mooring bases,
   wherein at least one of the mooring bases of the plurality of mooring bases is fastened to three to eight of the plurality of mooring lines, to thereby moor the at least one of the mooring bases to three to eight offshore structures of the group of offshore structures, and
   wherein the offshore structures and the mooring bases are arranged in such an asymmetrical arrangement pattern that, in a case where one of the mooring lines which moor the one offshore structure in the group of offshore structures is broken, when the one offshore structure moves within a range allowed by the remaining mooring lines, the one offshore structure is geometrically incapable of colliding with the other offshore structures,
   wherein each of the offshore structures is moored by one long mooring line and two short mooring lines among the plurality of mooring lines, and
   wherein mooring directions of the long mooring lines of each adjacent ones of the offshore structures are oriented in opposite radial directions of the offshore structure from each other.

* * * * *